US010384581B2

(12) United States Patent
Preisler et al.

(10) Patent No.: US 10,384,581 B2
(45) Date of Patent: Aug. 20, 2019

(54) POWERED MECHANIZED TRAY TABLE ASSEMBLY

(71) Applicant: JVIS-USA, LLC, Sterling Heights, MI (US)

(72) Inventors: Darius J. Preisler, Macomb, MI (US); Donald R. Schaefer, Waterford, MI (US); Jason T. Murar, Macomb, MI (US); Kendall Miller, New Baltimore, MI (US)

(73) Assignee: JVIS-USA, LLC, Sterling Heights, MI (US)

( * ) Notice: Subject to any disclaimer, the term of this patent is extended or adjusted under 35 U.S.C. 154(b) by 120 days.

(21) Appl. No.: 15/845,457

(22) Filed: Dec. 18, 2017

(65) Prior Publication Data

US 2019/0184885 A1    Jun. 20, 2019

(51) Int. Cl.
| | |
|---|---|
| *B60N 3/00* | (2006.01) |
| *A47B 1/10* | (2006.01) |
| *B60R 11/02* | (2006.01) |
| *B60R 11/00* | (2006.01) |

(52) U.S. Cl.
CPC ............... *B60N 3/004* (2013.01); *A47B 1/10* (2013.01); *B60R 11/0252* (2013.01); *B60R 2011/0075* (2013.01); *B60R 2011/0082* (2013.01)

(58) Field of Classification Search
None
See application file for complete search history.

(56) References Cited

U.S. PATENT DOCUMENTS

| | | |
|---|---|---|
| 1,333,301 A | 3/1920 | Fohman |
| 1,790,468 A | 1/1931 | Frank et al. |
| 1,809,866 A | 6/1931 | Riesche |

(Continued)

FOREIGN PATENT DOCUMENTS

| | | | |
|---|---|---|---|
| DE | 10212335 A1 * | 10/2003 | ............. B60N 3/004 |
| KR | 100966376 B1 | 6/2010 | |

(Continued)

OTHER PUBLICATIONS

United States Patent and Trademark Office, Non-Final Office Action for U.S. Appl. No. 15/844,787, dated Jun. 22, 2018.

*Primary Examiner* — David E Allred
(74) *Attorney, Agent, or Firm* — Brooks Kushman P.C.

(57) ABSTRACT

A tray table assembly capable of automatically deploying from a stowed position in a vehicular seat back towards a use position within a passenger compartment of a vehicle is provided. The assembly includes a support structure adapted to be coupled to the seat back, a tray support and a tray subassembly supported for rotation about a rotational axis by the tray support. A bi-directional, electrically-powered linear actuator subassembly is mounted on the support structure and includes a motor-driven screw-drive and a threaded member mounted on the screw-drive to linearly move along a longitudinal axis of the screw-drive upon rotation of the screw-drive. The threaded member is connected to the tray support to lift the tray support to deploy the tray subassembly along a predetermined non-linear path upon rotation of the screw-drive in a first direction from the stowed position to the use position based on a deployment command signal.

16 Claims, 6 Drawing Sheets

(56) References Cited

U.S. PATENT DOCUMENTS

| | | | |
|---|---|---|---|
| 1,887,102 A | 11/1932 | Mathie | |
| 2,132,279 A | 10/1938 | Wicknick et al. | |
| 2,168,210 A | 8/1939 | Hawksley | |
| 2,249,287 A | 7/1941 | Gearhart et al. | |
| 2,619,395 A | 11/1952 | Kent | |
| 2,963,078 A | 12/1960 | Ferrelle | |
| 3,795,422 A | 3/1974 | Robinson et al. | |
| 4,973,017 A | 11/1990 | Takagi | |
| 5,931,527 A | 8/1999 | D'Onofrio et al. | |
| 7,114,772 B2 * | 10/2006 | Kobayashi | B60N 2/206 297/188.04 |
| 7,607,726 B2 | 10/2009 | Orlo et al. | |
| 7,963,231 B2 | 6/2011 | Osborne et al. | |
| 8,096,612 B2 * | 1/2012 | Schumm | B60N 3/004 297/125 |
| 8,312,819 B2 | 11/2012 | Vignal et al. | |
| 8,695,513 B2 | 4/2014 | Figueras Mitjans | |
| 9,180,805 B2 | 11/2015 | Millan | |
| 9,352,840 B2 | 5/2016 | Schultheis | |
| 9,731,829 B2 | 8/2017 | Gow et al. | |
| 9,955,779 B2 | 5/2018 | Hoeftberger et al. | |
| 10,166,903 B2 * | 1/2019 | Oh | B60N 3/004 |
| 2007/0227407 A1 | 10/2007 | Cartensen | |
| 2011/0278885 A1 | 11/2011 | Procter et al. | |
| 2012/0262868 A1 * | 10/2012 | Kato | B60R 11/0235 361/679.21 |
| 2013/0093220 A1 | 4/2013 | Pajic | |
| 2014/0042781 A1 | 2/2014 | Reeves | |
| 2014/0241650 A1 | 8/2014 | Khankal et al. | |
| 2014/0292042 A1 | 10/2014 | Stewart et al. | |
| 2015/0323794 A1 * | 11/2015 | Mikami | G02B 27/0149 359/630 |
| 2016/0059759 A1 * | 3/2016 | Rook | B60N 3/004 297/173 |
| 2016/0250958 A1 | 9/2016 | Saada et al. | |
| 2017/0305359 A1 * | 10/2017 | Rook | B60R 11/0235 |
| 2017/0313258 A1 | 11/2017 | Argyle et al. | |
| 2018/0110323 A1 * | 4/2018 | Enzinger | A47B 5/006 |
| 2018/0344024 A1 * | 12/2018 | Kruger | A47B 9/06 |
| 2019/0135192 A1 * | 5/2019 | Adamson, Sr. | B60R 11/0229 |

FOREIGN PATENT DOCUMENTS

| | | |
|---|---|---|
| KR | 20110004602 A | 1/2011 |
| KR | 101454923 B1 | 10/2014 |

* cited by examiner

POWERED MECHANIZED TRAY TABLE ASSEMBLY

CROSS-REFERENCE TO RELATED APPLICATIONS

This application is related to U.S. patent application entitled "Mechanized Tray Table Assembly" filed on the same day as this application.

TECHNICAL FIELD

This invention is generally related to deployable tray table assemblies for use in passenger compartments of vehicles and, in particular, to such assemblies which are deployable from a stowed position in a vehicular seat back.

OVERVIEW

Figure 1:
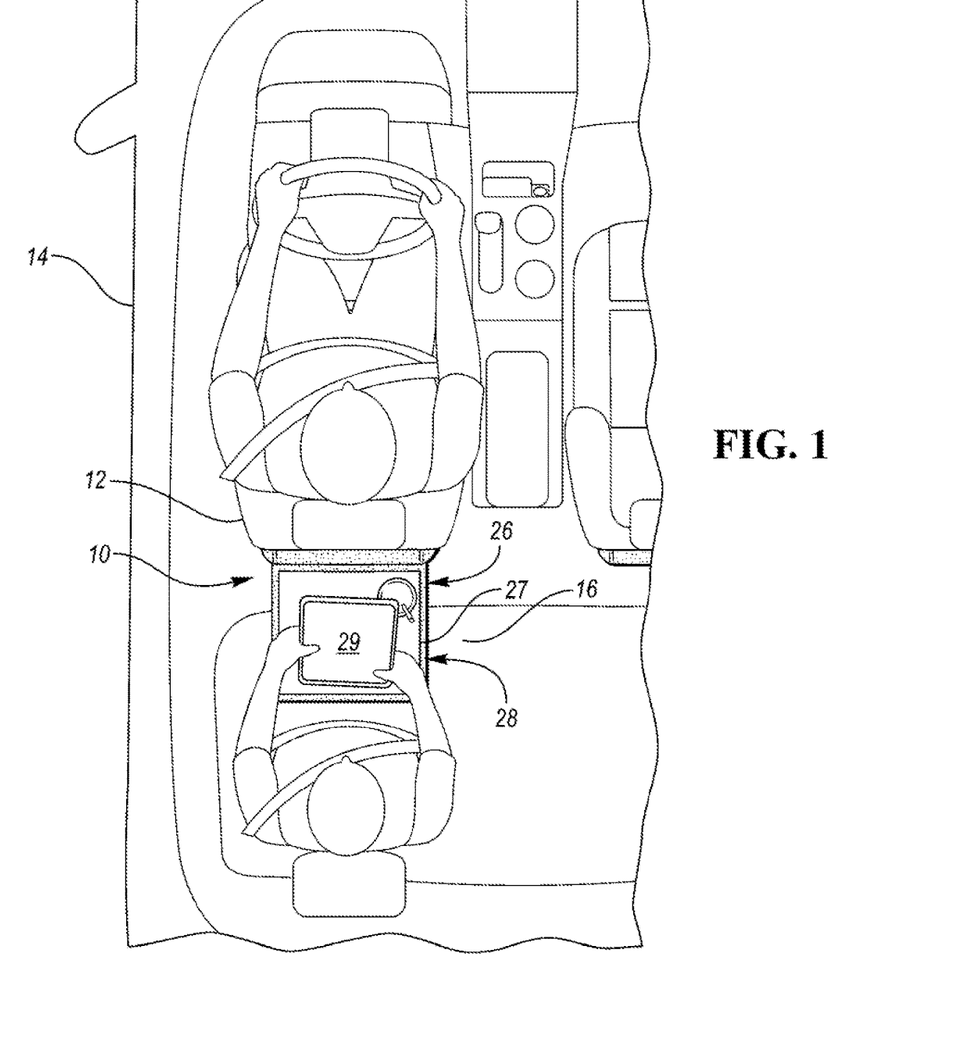
FIG. 1 is a top plain environmental view, partially broken away, of a vehicle interior with a deployed tray table assembly in use by a backseat passenger.

As shown in FIG. 1, generally, seats installed in an interior of a vehicle are typically classified into a bucket seat for a passenger and a bench seat on which two or more passengers can simultaneously seat. A head restraint is installed at an upper end portion of a backrest. A seat back table that can be folded or unfolded backward may be installed at the backrest for the sake of a rear passenger's convenience.

Such a seat back is installed on the rear of a seat backrest so that a backseat passenger can use the seat back table for reading, handwriting, or a simple dining table, and is formed to be unfolded when it is used and folded when it is not used.

As described in patent document US 2014/0042781, vehicle interiors fulfil a dual role in providing safety for the occupants of the vehicle as well as comfort. This includes providing storage space for the ever increasing number or essential objects that a person may carry with them. In particular, there is an increase of personal electronic devices ("PEDs") being used and carried by people. Storage space in a vehicle is at a premium, particularly for occupants in the back seats of a vehicle who are unable to directly assess many of the conventional storage compartments of a vehicle during travel. This includes for example the glove compartment, compartments located on the dashboard or center console of a car, or even side pockets in the front doors or storage spaces under the headliner.

As described in patent document US 2017/0313258, in many instances, passenger vehicles, such as aircraft, buses, trains, ships and automobiles, include passenger seats with a wide assortment of portable electronic and entertainment options to encourage passengers to remain seated as much as possible during transport for safety, crew mobility and to enable efficient cabin service. Some passenger seats may provide video and audio entertainment, including television, video games, internet access, and other on-board entertainment ("OBE") or in-flight entertainment ("IFE") components. Typically, these entertainment devices are mounted in the seat backs and arm rest of the passenger seats.

With the advent of PEDs, such as tablet computers, mobile phones, smart phones, handheld video game systems, personal digital assistants, palmtop computers, DVD players, data and audio-video media, multi-media enabled devices, and other similar electronic devices, many passengers prefer to use their own PEDs, rather than the OBE or IFE components that are mounted in the passenger seats.

The rate at which PEDs, namely mobile phones, tablets, portable computers, personal digital assistants ("PDAs"), have been evolving has been exponential. These devises are constantly increasing in functions and decreasing/altering in size, making them more portable and at the same time able to perform more tasks. This evolution has led to passengers carrying their personal information and media on these devices with the expectation of using them while traveling.

To this point, there have been very few examples of the integration of these PEDs into airplane seats in any specific way to the seat, other than providing a location on a tray table, such as a groove to hold the PED, and sometimes a power connection to charge them. Because the mounting location is in the tray table, which must be stowed during certain times during flight, there is still a need for passengers to have a way to 'hold' or 'store' these PEDs while in flight in a manner that allows the PEDs to be used and enjoyed at any given moment. Furthermore, when the mounting location is a groove, the design inherently limits the thickness of the PEDs that may be secured in that location based on the thickness of the groove. Also, by using the tray table to support the PED, it is not positioned at eye level, which generates discomfort after prolonged periods of time.

Other solutions to date involve attaching a case (either provided by airlines or customer-purchased) to the backs of passenger seats as an add-on device. A drawback to this solution is that most cases are not adaptable to a large range of differing sizes and shapes of PEDs (e.g. a case for a mobile phone often is not sized to accommodate a tablet or surface computer). For example, the cases offered by one airline can only hold iPads, so other types of tablets or cellphones are not supported. An example of an improvement on conventional cases is shown in U.S. Publication No. 2011/0278885, wherein a cradle formed of multiple adjustable arms to support PEDs of varying sizes and shapes is configured to mount to a port within a passenger seat, and the connection between the cradle and the port also a power connection, and/or a communication connection to the OBE or IFE systems and/or the internet to the PED.

When such cases are provided by the passengers, the passenger is able to ensure that the case will fit his or her device, but cannot be sure that the case will fit all types of passenger seats. As a result, the passenger may be forced to purchase an item that he or she may not be able to use on any other occasion. When provided by the airline, this solution creates the additional problem of having to carry on the plane a large amount of cases to provide for the passengers, while also having to ensure that passengers will not take the holders with them after the flight.

In some cases, it may be desirable to provide a way for passengers to connect their PEDs to the OBE or IFE systems, so that they may use their own PEDs in lieu of the OBE or IFE systems. In other cases, it may be desirable to provide a way for passengers to connect their PEDs to the OBE or IFE systems to use in conjunction with the system's video display or to receive power for their PEDs or otherwise.

As a result, there is still a need for a support for PEDs that is always available and adaptable to a wide range of PED sizes, shapes, and thicknesses, and that does not create the need for an extra case or coupling assembly. Such a solution eliminates the need for airlines to provide a large number of cases, which represents additional weight and the need for additional storage space, as well as eliminating the costs for passengers to purchase an additional case for his or her PED. Such a solution also allows passengers to use their PEDs with or without a case, and to make the tray tables available for meals, documents, or any other object, or to allow passengers to stow the tray tables while still having the PEDs securely placed for use and/or viewing.

U.S. Pat. No. 9,352,840 discloses a tray table for use with a passenger seat of a transportation vehicle. The tray table may be moveable between a deployed position and a stowed position relative to a seat. The tray table may include a storage compartment for storing belongings of a passenger. A lid may be provided for covering an opening of the storage compartment. A portion of the lid may be transparent such that contents of the storage compartment is in the deployed position. A portion of a storage compartment bottom may be transparent such that contents of the storage compartment may be readily viewed by a passenger when the tray table is in the stowed position. The tray table may have any number of storage compartments and a single lid or multiple lids may be used to cover the storage compartment openings.

Patent document U.S. 2013/0093220 discloses a tray table with a rotatable inner tray for electronic device docking.

U.S. Pat. No. 7,607,726 discloses a vehicle seat has a seat bottom and a seat back, which pivots at a rear side of the seat bottom. Within the rearward-facing surface of the seat back, a seat back tray is housed. When in a front passenger seat that is folded forward, the seat back tray is accessible by a vehicle driver. To adjust the tray horizontally, a tray top pivots relative to and above a non-pivoting tray top. A track within the tray provides a guide for movement of the pivotable tray top. A scissor lift coupled to an adjustment mechanism including either a hand crank or electric motor, may raise and lower the tray from a retracted position to an extending position, and be fixed at any intermediary position.

The following U.S. patent documents are also related to at least one embodiment of the present invention: U.S. Pat. Nos. 8,312,819; 2014/0241650; 2014/0292042; and 9,180,805.

The term 'bus' and variations thereof, as used herein, refers to a subsystem that transfers information and/or data between various components. A bus generally refers to the collection communication hardware interface, interconnects, bus architecture, and/or protocol defining the communication scheme for a communication system and/or communication network. A bus may also be specifically referred to as a part of communication hardware that interfaces the communication hardware with the interconnects that connect to other components of a corresponding communication network. The bus may be for a wired network, such as a physical bus, or wireless network, such as part of an antenna or hardware that couples the communication hardware with the antenna. A bus architecture supports a defined format in which information and/or data is arranged when sent and received through a communication network. A protocol may define the format and rules of communication of a bus architecture.

The term "vehicle", as used herein, includes any conveyance, or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

Despite the above prior art, there is a need for a low cost, compact tray table assembly capable of automatically deploying from a stowed position in a seat back towards a use position.

SUMMARY OF EXAMPLE EMBODIMENTS

An object of at least one embodiment of the present invention is to provide a cost effective, compact assembly, such as a tray table assembly, wherein the assembly is powered to automatically deploy from a stowed position in a seat back towards a use position and provides easy access to stowed items such as portable electronic devices ("PEDs") in a container of a tray subassembly.

In carrying out the above object and other objects of at least one embodiment of the present invention, tray table assembly capable of automatically deploying from a stowed position in a vehicular seat back towards a use position within a passenger compartment of a vehicle is provided. The assembly includes a support structure adapted to be coupled to the seat back, a tray support and a tray subassembly supported for rotation about a rotational axis by the tray support. The tray subassembly includes a lid having open and closed positions and a container having an opening for allowing ingress and egress of items into and out of a storage compartment of the container, respectively, in the open position of the lid. A bi-directional, electrically-powered linear actuator subassembly is mounted on the support structure and includes a motor-driven screw-drive and a threaded member mounted on the screw-drive to linearly move along a longitudinal axis of the screw-drive upon rotation of the screw-drive. The threaded member is connected to the tray support to lift the tray support to deploy the tray subassembly along a predetermined non-linear path upon rotation of the screw-drive in a first direction from the stowed position to the use position based on a deployment command signal.

The assembly may further include a gesture-actuated latching device having locked and unlocked states for locking and unlocking the tray subassembly, respectively. The latching device prevents movement of the tray subassembly in the locked state and allowing movement of the tray subassembly in the unlocked state.

The screw-drive may include a lead screw.

The actuator subassembly may include a reversible electric motor mounted on the support structure and which drives the lead screw.

The actuator subassembly may include an electric motor wherein the actuator subassembly may be configured to rotate and translate the tray subassembly to the use position along the nonlinear path.

The container may receive electrical wiring to supply electrical power or digital data to the container.

The assembly may further include an actuator slide to guide linear motion of the tray support.

The actuator slide may include at least one guide rod positioned substantially parallel to the longitudinal axis wherein the tray support is driven along the at least one guide rod.

The assembly may further include a pair of spaced slides to slideably support the container during movement of the container between extended and retracted positions of the container.

The actuator subassembly may retract the tray support upon rotation of the screw-drive in a second direction opposite the first direction from the use position towards the stowed position based on a retraction command signal.

Further is carrying out the above object and other objects of at least one embodiment of the present invention, a non-vehicular tray table assembly capable of automatically deploying from a stowed position in a seat back towards a use position is provided.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 5:
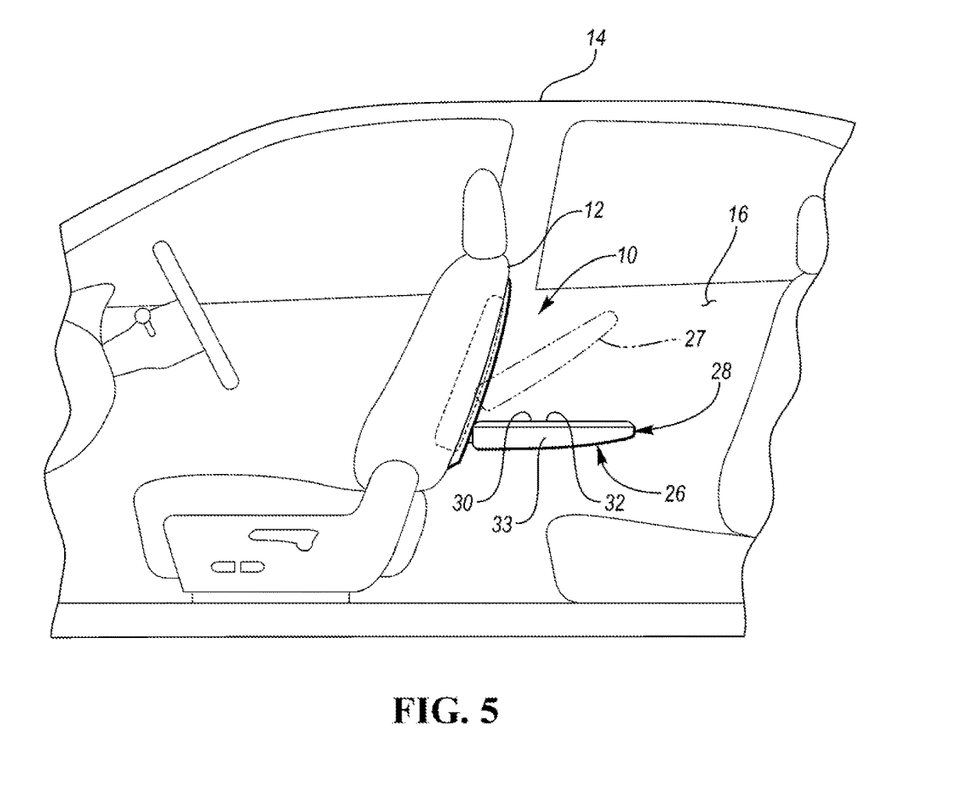
FIG. 5 is a side elevational environmental view, partially broken away, of the tray table assembly in its use position with a lid of a tray subassembly in its open position to allow ingress and egress of items such as one or more PEDs into a storage compartment of a container of the tray subassembly.
Figure 6:
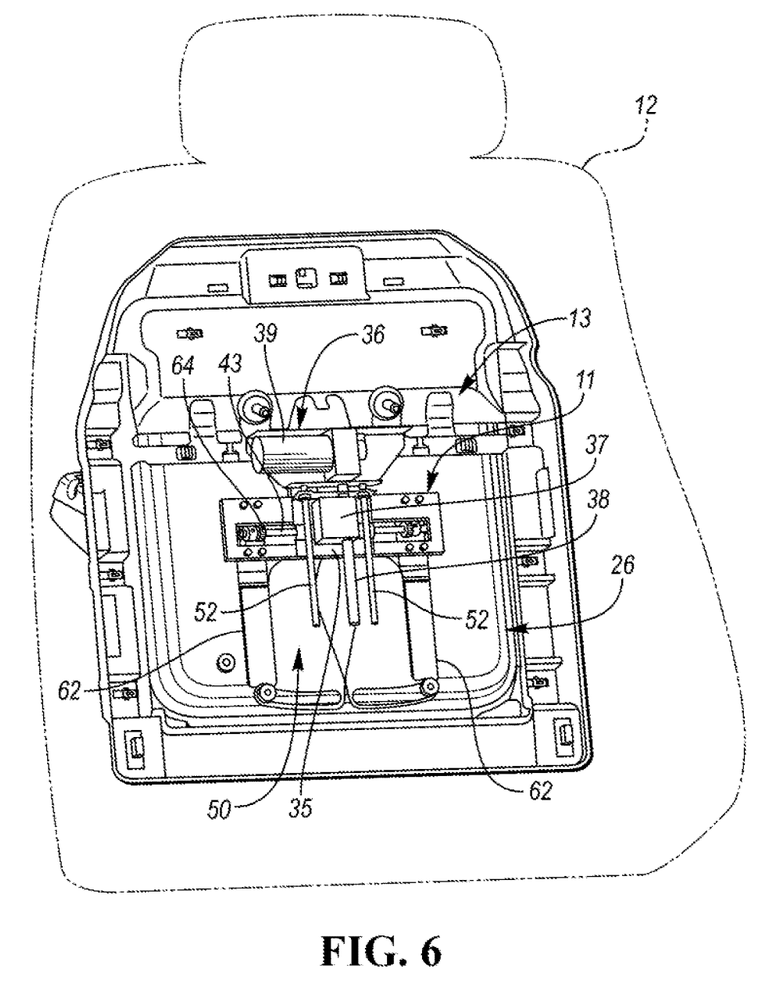
FIG. 6 is a front view similar to the view of FIG. 3, but with the tray support in its raised position.

Referring to FIGS. 1 and 5, there is illustrated an assembly, such as a tray table assembly, generally indicated at 10, capable of deploying from a stowed position in a vehicular seat back 12 towards a use position within a passenger compartment 16 of a vehicle 14.

The assembly 10 includes a tray subassembly, generally indicated at 26, including a lid 27 having open and closed positions and a container, generally indicated at 28, having an opening 30 (FIG. 5) for allowing ingress and egress of items into and out of a storage compartment 32 of the container 28, respectively, in the open position of the lid 27. The items may include one or more portable electric devices (PEDs) such as a PED 29.

The tray subassembly 26 is preferably pivotally mounted on an elongated tray support 11 which, in turn, is mounted for linear movement with a support structure, generally indicated at 13, which, in turn, is adapted to be coupled to the seat back 12. The tray support 11 is supported in a stowed position within the seat back 12 for linear movement between upper and lower positions.

The tray support 11 is configured to moveably hold the tray subassembly 26 in the seat back 12 in the stowed position and is configured to allow the stowed item to be removed from the container 28 in the deployed position by a passenger of the vehicle 14. The lid 27 may be spring loaded and hingedly attached to the container 28 by a hinge assembly (not shown).

Figure 2:
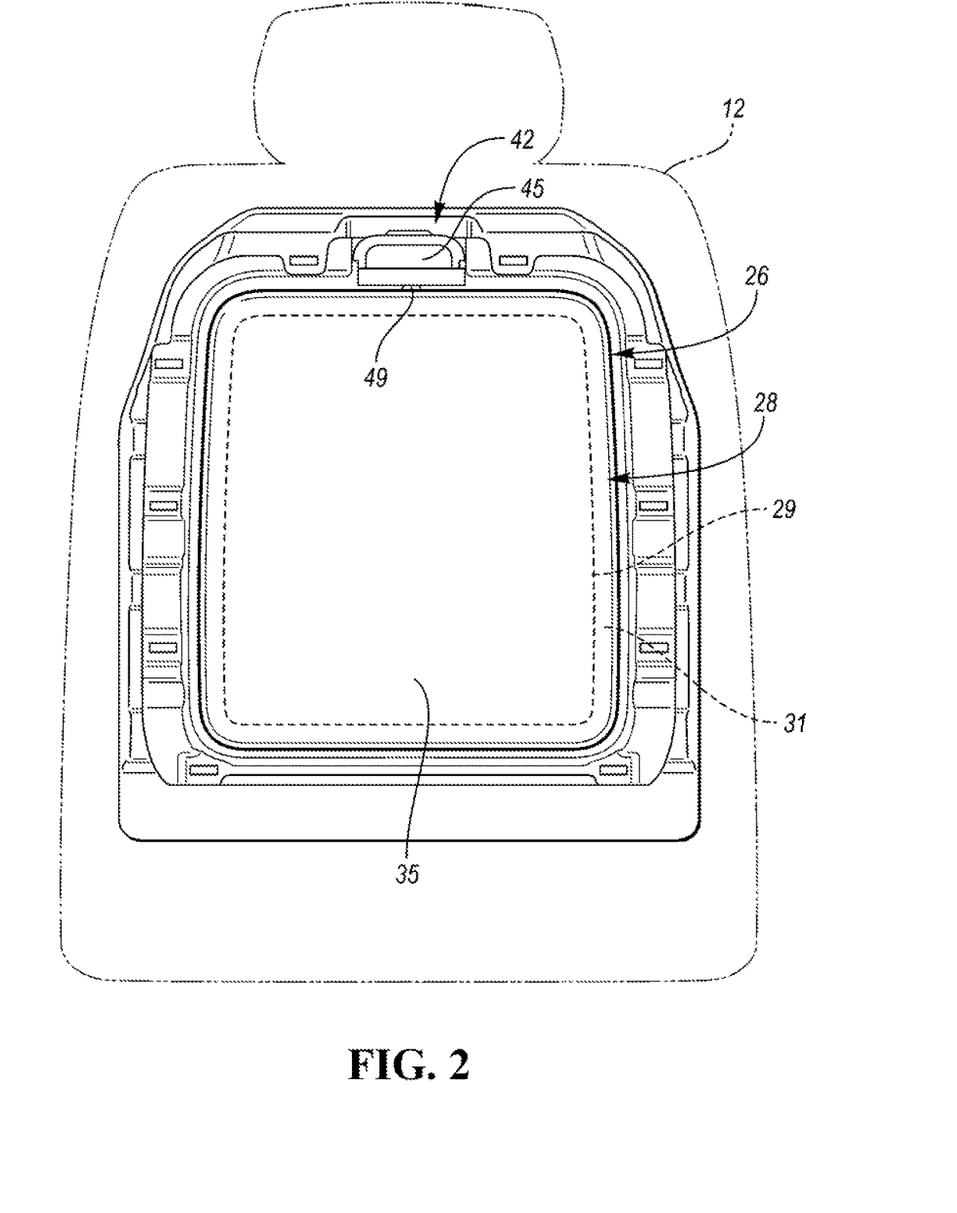
FIG. 2 is a back view of the tray table assembly stowed in a vehicle seat back shown in phantom.
Figure 3:
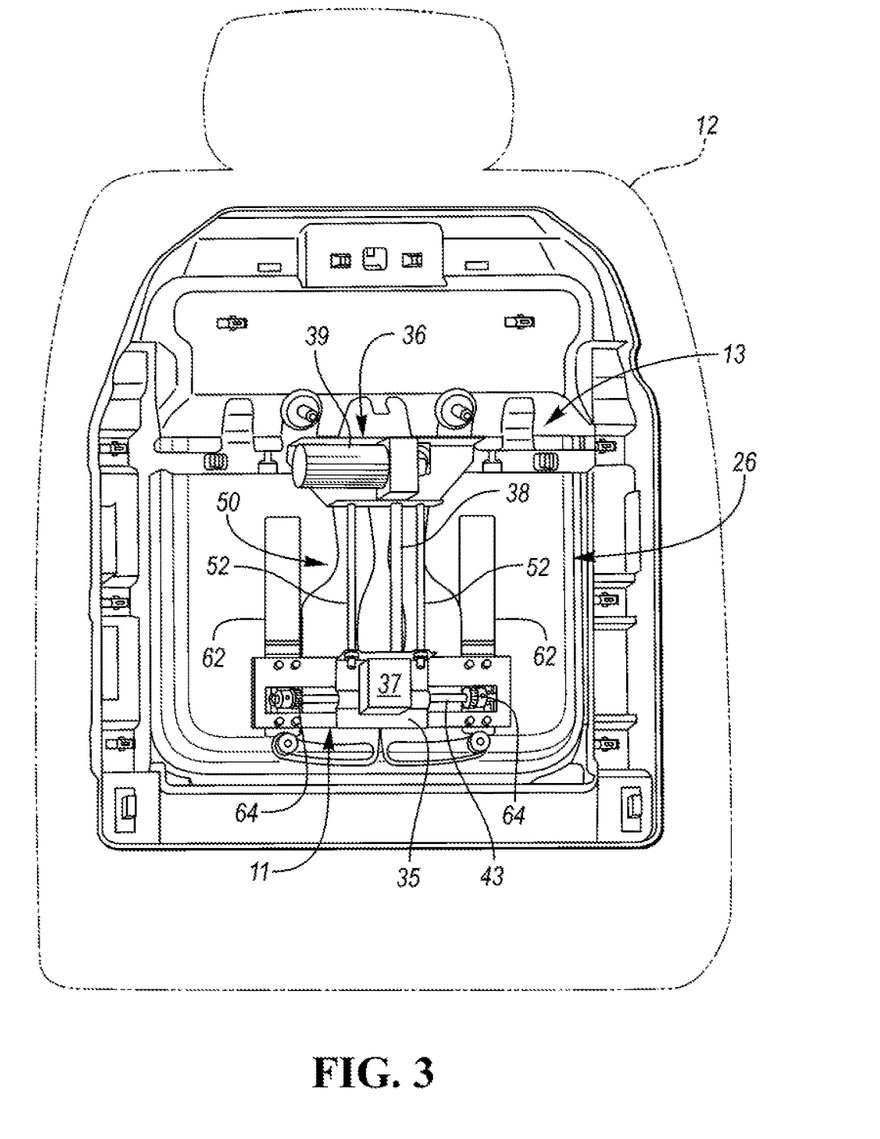
FIG. 3 is a front view of the stowed tray table assembly with its tray support in its lowered position and without a back cushion or covering panel.

The container 28 typically has a bottom panel 35 and side panels 33 to form the container 28. An adjustable insert 31 (indicated by phantom lines in FIG. 2) is formed generally in the shape of the stowed PED 29 and is snuggly fit into the container 28 and thereafter adjusted to hold the PED 29 and thereby prevent the PED 29 from sliding during movement of the container 28.

A bi-directional, electrically-powered, linear actuator subassembly, generally indicated at 36, is mounted on the support structure 13 and includes a motor-driven screw-drive or load screw 38 and a threaded member 37 mounted on the screw-drive 37 to linearly move along a longitudinal axis of the screw-drive 38 upon rotation of the screw-drive 38. The member 37 is fixed to a bracket 35 so movement of the member 37 moves the bracket 35 which, in turn, moves the tray support 11 to which the bracket 35 is connected.

Figure 4:
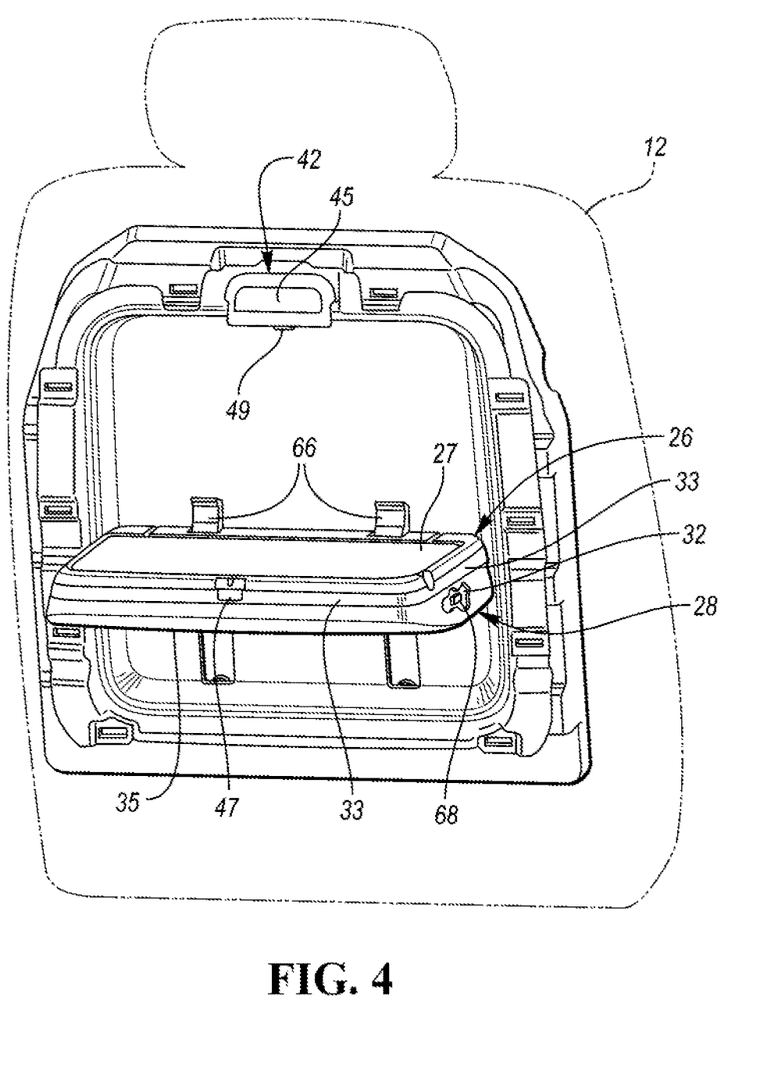
FIG. 4 is a back perspective view of the tray table assembly in its use position with a covering panel.

In other words, the threaded member 37 is connected to the elongated tray support 11 through the bracket 35 to lift the elongated support 11 to deploy the tray subassembly 26 along a predetermined, non-linear path upon rotation of the screw-drive 38 in a first direction from the stowed position to the position of FIGS. 1, 4 and 5 based on a deployment command signal from a motor controller (not shown).

The subassembly 36 may include a reversible electric motor 39 mounted on the support structure 13 and which drives the lead screw 38. The subassembly 36 may be configured to rotate and translate the tray support 11 to the use position from its stowed position along the non-linear path which may be an elliptical path.

The assembly 10 may further include an actuator slide, generally indicated at 50, to guide linear motion of the elongated support 11. The actuator slide 50 may include at least one, and preferably two, guide rods 52 positioned substantially parallel to the longitudinal axis of the screw-drive 38. The elongated support 11 is driven along the guide rods 52.

Electric wiring (not shown) typically supplies electrical power and/or data to the PED 29 stored in the container 28 from a power source (not shown).

The linear actuator subassembly 36 may retract the tray support 11 upon rotation of the screw-drive 38 in a second direction opposite the first direction from the use position towards the stowed position based on a retraction command signal received by the motor 39 from the motor controller.

The assembly 10 is suitable for use with an automobile, which can be any passenger vehicle used for land transportation, such as a car, minivan, truck, etc. The assembly 10 may be used with any type of vehicle, such as water vehicles, air vehicles, etc.

The assembly 10 may further include a simple-to-operate, gesture-actuated, latching device, generally indicated at 42, having locked and unlocked states for locking and unlocking the tray subassembly 26, respectively, to the support structure 13. The latching device 42 prevents movement of the tray subassembly 26 away from the support structure 13 in the locked state and allows the tray subassembly 26 to move towards its open, deployed position in the unlocked state by means of the actuator subassembly 36.

The latching device 42 may include a latch coupler or spring-loaded plunger actuated by a button 45 and supported on the support structure 13 and an aperture 47 (FIG. 4) in the container 28 which receives a latching member or pawl 49 which is actuated by the plunger upon manual actuation of the button 45 of the device 42 by a rear-seated passenger of the vehicle 14.

The assembly 10 may further include a pair of spaced slides (not shown) connected to the tray support 11 and side panels 33 of the container 28 to slideable support the tray subassembly 26 during movement of the tray assembly 26 between its extended and retracted positions. The slides may slide on rails (not shown).

Resilient spring bumpers (not shown) located on the support structure 13 bias the tray subassembly 26 towards its open, deployed position. Upon actuation of the latching device 42 by a passenger of the vehicle 14, the bumpers push the tray subassembly 26 away from the seat back 12 a predetermined amount, such as approximately 5 degrees. Thereafter, the actuator subassembly 36 lifts the tray support 11 and consequently, the tray subassembly 26 towards its deployed upper position and allow the tray subassembly 26 to rotate to its horizontal position of FIG. 4.

A pair of toothed guide members 62 mesh with pinions 64 rotatably supported on a shaft 43 mounted on the tray support 11 to guide upward and downward movement of the tray support 11.

A pair of spaced brackets 66 (FIG. 4) are supported on the tray support 11 for movement therewith to hold the tray subassembly 26 in its substantially horizontal position in FIG. 4.

One or more connectors such as a connector 68 (FIG. 4) may be provided in the storage compartment 32 to provide electrical power or digital data to a PED 29 located or stored within the container 28 via electrical wiring (not shown). Alternatively, electrical power and/or digital data may be provided to the PED 29 within the container 28 wirelessly in any well-known fashion such as by a bus.

The assembly 10 may be electrically connected to a main controller of an electrical system of the vehicle. The main controller is typically electrically connected to one or more switches and/or one of more sensors so that the assembly can be manually or automatically operated to turn on the assembly 10. For example, the main controller can be electrically connected to the button 45, an ignition switch, a light sensor, a headlight switch and/or an interior light switch as needed and/or desired.

The motor driver or controller may be coupled to the main controller of the vehicle. The driver may comprise one or more analog and/or digital electrical or electronic components, and may include a microprocessor, microcontroller, application-specific integrated circuit (ASIC), programmable logic, and/or other circuit elements. According to an exemplary embodiment, the driver may be configured to receive data via one or more electrical wires or buses such as the leads from a plurality of automobile systems within the automobile. For example, the driver can be configured to receive data from sensors on the automobile.

In one exemplary embodiment, the motor driver may have a power source and control circuitry to operate the motor. The driver may be an LIN driver including a LIN transceiver, a LIN protocol/controller and a microcontroller (MCU).

The ECU of the vehicle and the motor driver or controller are typically connected via a vehicle bus such as a local interconnect network (LIN or CAN) line or bus capable of two-way communications. LIN is one of many possible in-vehicle local area network (LAN communications) protocols. A power line and a ground line may be provided between the ECU and the controller (via leads). The controller typically includes a transceiver interface within the MCU, a microprocessor and its control logic within the MCU, the drive or driver, and an electrical power source. The controller may be integrated or physically coupled with the motor 39 in the motor housing, while the ECU is provided some distance away from the motor housing.

The power source or circuit of the controller supplies electric power of predetermined voltage levels to the MCU through the drive or driver. The transceiver within the MCU is a communications interface circuit connected to the network or vehicle bus for communications and operates as a receiver section for the MCU and a transmitter section back to the ECU. The driver typically includes the driver circuit for driving the motor 39.

The MCU of the driver typically includes a memory and may be configured as a conventional microcomputer including a CPU, a ROM, a RAM and the like or as a hardwired logic circuit.

The ECU and the controller may perform data communications regularly through the LIN or CAN bus. In such data communications, the controller or driver may transmit state data indicating the state of the motor 39 to the ECU.

The ECU and/or the controller may confirm the desired state of the motor 39. The state of the ECU is based on various states detected by non-contact position sensor(s), commands and the present state of the motor 39 to generate commands.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tray table assembly capable of automatically deploying from a stowed position in a vehicular seat back towards a use position within a passenger compartment of a vehicle, the assembly comprising:
    a support structure mounted on the seat back and having a front side and a back side and a pair of lengthwise vertical guides opening through the support structure;
    a tray support elongated in a lateral direction and adjustably supported on the support structure at least by engaging respective guides of the pair of guides;
    a tray subassembly supported by the tray support for rotation wherein the tray subassembly includes a lid having open and closed positions and a container having an opening for allowing ingress and egress of items into and out of a storage compartment of the container, respectively, in the open position of the lid; and
    a bi-directional, electrically-powered linear actuator subassembly mounted on the support structure and including a motor-driven screw-drive and a threaded member mounted on the screw-drive to linearly move along a longitudinal axis of the screw-drive upon rotation of the screw-drive, the threaded member being connected to the tray support to lift the tray support upon rotation of the screw-drive in a first direction from the stowed position to the use position based on a deployment command signal, wherein the tray assembly is coupled to the tray support through the guides such that the tray support is on the front side and the tray assembly is on the back side of the support structure.

2. The assembly as claimed in claim 1 further comprising a latching device having locked and unlocked states for locking and unlocking the tray subassembly, respectively, the latching device preventing movement of the tray subassembly in the locked state and allowing movement of the tray subassembly in the unlocked state.

3. The assembly as claimed in claim 1 wherein the screw-drive includes a lead screw.

4. The assembly as claimed in claim 3 wherein the actuator subassembly includes a reversible electric motor mounted on the support structure and which drives the lead screw.

5. The assembly as claimed in claim 1 wherein the actuator subassembly includes an electric motor.

6. The assembly as claimed in claim 1 further comprising an actuator slide to guide linear motion of the tray support.

7. The assembly as claimed in claim 6 wherein the actuator slide includes at least one guide rod positioned substantially parallel to the longitudinal axis wherein the tray support is driven along the at least one guide rod.

8. The assembly as claimed in claim 1 wherein the actuator subassembly retracts the tray support upon rotation of the screw-drive in a second direction opposite the first direction from the use position towards the stowed position based on a retraction command signal.

9. A non-vehicular tray table assembly capable of automatically deploying from a stowed position is a seat back towards a use position, the assembly comprising:
 a support structure mounted on the seat back and having a front side and a back side and a pair of lengthwise vertical guides opening through the support structure;
 a tray support elongated in a lateral direction and adjustably supported on the support structure at least by engaging respective guides of the pair of guides;
 a tray subassembly supported by the tray support for rotation wherein the tray subassembly includes a lid having open and closed positions and a container having an opening for allowing ingress and egress of items into and out of a storage compartment of the container, respectively, in the open position of the lid; and
 a bi-directional, electrically-powered linear actuator subassembly mounted on the support structure and including a motor-driven screw-drive and a threaded member mounted on the screw-drive to linearly move along a longitudinal axis of the screw-drive upon rotation of the screw-drive, the threaded member being connected to the tray support to lift the tray support upon rotation of the screw-drive in a first direction from the stowed position to the use position based on a deployment command signal, wherein the tray assembly is coupled to the tray support through the guides such that the tray support is on the front side and the tray assembly is on the back side of the support structure.

10. The assembly as claimed in claim 9 further comprising a latching device having locked and unlocked states for locking and unlocking the tray subassembly, respectively, the latching device preventing movement of the tray subassembly in the locked state and allowing movement of the tray subassembly in the unlocked state.

11. The assembly as claimed in claim 9 wherein the screw-drive includes a lead screw.

12. The assembly as claimed in claim 11 wherein the actuator subassembly includes a reversible electric motor mounted on the support structure and which drives the lead screw.

13. The assembly as claimed in claim 9 wherein the actuator subassembly includes an electric motor.

14. The assembly as claimed in claim 9 further comprising an actuator slide to guide linear motion of the tray support.

15. The assembly as claimed in claim 14 wherein the actuator slide includes at least one guide rod positioned substantially parallel to the longitudinal axis wherein the tray support is driven along the at least one guide rod.

16. The assembly as claimed in claim 9 wherein the actuator subassembly retracts the tray support upon rotation of the screw-drive in a second direction opposite the first direction from the use position towards the stowed position based on a retraction command signal.

\* \* \* \* \*